United States Patent [19]

O'Connell

[11] 4,383,744
[45] May 17, 1983

[54] REMOTE CAMERA ACTUATOR

[76] Inventor: Charles J. O'Connell, 621 Waterloo Rd., Apt. 334, Warrenton, Va. 22186

[21] Appl. No.: 251,830

[22] Filed: Apr. 7, 1981

[51] Int. Cl.³ .................... G03B 17/38; G03B 29/00
[52] U.S. Cl. .................................. 354/81; 354/173; 354/266
[58] Field of Search .................. 354/75, 76, 80, 81, 354/266, 269, 67, 173; 352/179; 346/107 R

[56] References Cited

U.S. PATENT DOCUMENTS 3,672,269  6/1972  Tabankin ........................ 354/75
4,063,251 12/1977  Harsnett ...................... 354/75 X
4,180,316 12/1979  Della-Calce .................. 354/81 X

FOREIGN PATENT DOCUMENTS 159399 12/1962 U.S.S.R. ......................... 354/67

Primary Examiner—John Gonzales
Attorney, Agent, or Firm—Sughrue, Mion, Zinn, Macpeak and Seas

[57] ABSTRACT

A system for the remote actuation of a camera. A sensor is provided at a point remote from the camera and actuated by an object to be photographed. Actuation closes a circuit between a power source and a motor to drive the motor. The output motion of the camera is transmitted to the camera to depress the shutter. The output is controlled by gears and a linkage to ensure that a minimum number of frames are exposed and that the shutter is restored to its initial position.

1 Claim, 2 Drawing Figures

REMOTE CAMERA ACTUATOR

BACKGROUND OF THE INVENTION

This invention relates to a system for actuation of a camera without the presence or action of a human operator. Systems are known utilizing long trip wires or remote radial control to actuate the camera from a point distant from the location of the camera itself. Such techniques allow the operator to position a camera for taking a picture, allowing the operator to place himself at a point that is physically removed from the camera, and to actuate the camera when the event that is to be recorded occurs. Such systems find utilization in wildlife photography, pictures of the operator himself, and various time lapse events where the camera remains stationary relative to an evolving object.

In all of these systems, a hallmark is the requirement that the operator actuate the camera himself. That is, whether actuation is by trip wire or remote control, the human operator must initiate the photography sequence himself. There are, however, many events which occur at random which might be missed by the photographer or involve unduly long waits waiting for the photography event to occur. For example, in wildlife photography, such as taking pictures of birds, small animals, and the like, the opportunity to take a picture occurs only briefly and the operator must be alert to actuate the camera at the correct time. The event may occur only intermittently and without warning. Accordingly, the requirement in the prior art that the operator be alert and ready to actuate the camera almost instantaneously places an excessive burden on the operator and results in many missed photo opportunities.

SUMMARY OF THE INVENTION

Given the deficiencies of the prior art, it is an object of this invention to provide a remote camera actuating system not requiring human operation.

It is a further object of this invention to provide a system for actuating a camera wherein the subject itself initiates the actuation process.

Another object of this invention is to provide a remote camera actuator that can be camouflaged to allow for wildlife photography to take place on an unimpeded basis as photographic opportunities occur.

Yet another object of this invention is to provide a remote camera actuator having the capability to take either single or multiple exposures dependent only on camera configuration.

These and other objects of this invention are accomplished by means of a camera actuation system utilizing a remote sensor providing a signal input to a shutter actuation device. The sensor is positioned at a point distant from the actuator and may be camouflaged and provided with bait to lure subjects for photography. In the case of wildlife studies, bird food, scraps of meat or the like, can be placed over the sensor to lure subjects into position. The camera is prefocused at this position. As the subjects stand over the actuator, a microswitch or the like is closed, transmitting a signal to the shutter actuation mechanism.

The mechanism housed in an environmentally protected box comprises an electric motor receiving an input signal from the microswitch and operatively coupled by cam gear or the like to a shutter depression lever. The camera is held in place in the actuator box. Upon activation of the motor, the shutter actuator engages the camera shutter button for a time dependent on the rotational rate of the motor, cam surface area or the like. The motor continues turning so long as it receives a signal from the microswitch. In the case of single exposures, the actuator would depress the camera shutter button and release it during one rotation of the motor to take a single exposure.

In the case of multiple exposures, the number would be dependent on the type of winder used in conjunction with the camera. If the winder advances the film so long as the shutter button is depressed, a number of exposures will take place so long as the motor turns. The use of a cam plate allows optimization of motor rotation rate with the known advancement mechanism of the camera winder. Alternatively, if the winder advances the film once for each depression of the shutter button, a sequential up and down movement of the camera actuator will produce multiple photographs by having the shutter depressed, the exposure taking place, shutter released and the film advanced for the next cyclic operation of the actuator mechanism.

The camera is locked into position on the actuator box housing in the horizontal position. If it is desired to take pictures with the camera exposed vertically, the entire box may be placed on its side. Since the actuator mechanism provides a positive coupling between the motor and the shutter button, positioning of the camera in this manner is unaffected.

Initiation of the photography sequence occurs entirely by activation off the remotely placed microswitch. Therefore, once the system has been positioned and the camera properly focused, the device may be left unattended for as long as desired. This invention will be described in greater detail with reference to the attached drawings and the description of the preferred embodiment that follows.

DESCRIPTION OF THE PREFERRED EMBODIMENTS

Figure 1:
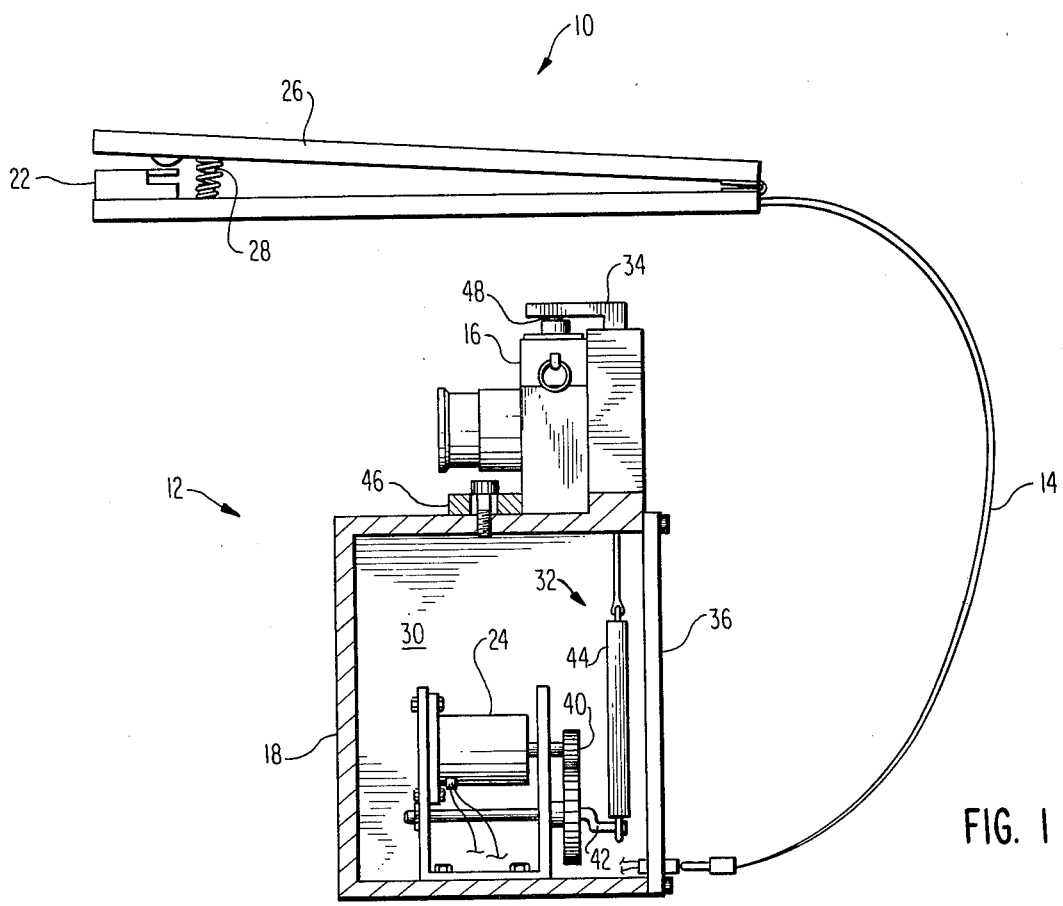
FIG. 1 is a schematic view showing the overall system in accordance with the present invention.

Referring now to FIG. 1, an overall schematic view of this system is shown. The system comprises an actuating assembly 10 coupled to an actuator control mechanism 12 via line 14. A camera 16 is mounted on an actuator housing 18.

The actuator control 12 includes a source of power typically a battery 20 placed in series between an actuating switch 22 on the actuating assembly and a control motor 24. The switch 22 is normally opened and closes when a subject of interest places pressure on the actuating assembly 10. Closure of the switch completes the circuit between the battery and the motor allowing the motor to rotate.

The actuating assembly 10 comprises a pressure plate 26 with the switch 22 disposed underneath. The plate can be suitably hidden or camouflaged so that subjects of interest, such as birds, wild animals and the like, will step on the plate and unknowningly initiate a photography sequence. A spring 28 is provided between the plate actuator and a ground piece to provide a restoring bias force urging the actuator upward and therefore opening the switch 22 when there is insufficient or no pressure on the actuator plate 26. The plate actuator may be coupled to a base member by hinging or the like.

Figure 2:
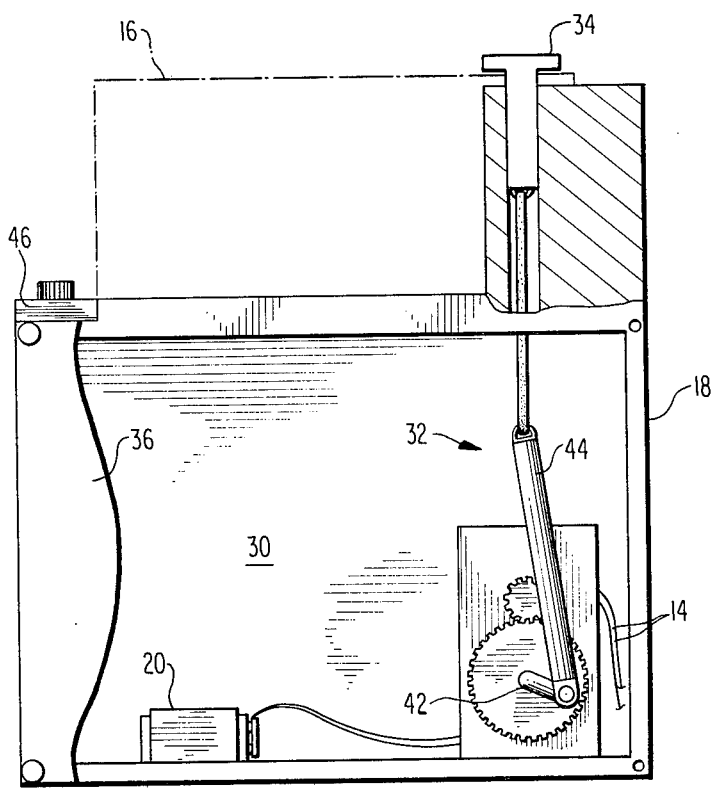
FIG. 2 is a perspective cutaway drawing showing the essential aspects of the camera shutter actuator.

Referring now to FIG. 2, the details of the actuator control portion of this system are shown. The actuator housing 18 provides environmental protection for not only the control mechanism but also the camera. While the control motor 24, battery 20 and the like can be placed in any suitable housing, construction of the device of materials such as Plexiglass or the like is preferred, since it provides the necessary transparent window for the camera. The actuator housing 18 comprises a control compartment 30 housing the battery 20, the control motor 24, and a drive mechanism 32 coupling the output of the motor 24 to a camera actuating lever 34. The housing 18 has a removable panel 36 for access to the control compartment 30. This allows for access to the battery, motor and drive mechanism. The battery 20 is held in place by a suitable mounting and restraining device such as elastic bands or the like. Alternatively, a holder may be provided. The battery typically a 9-volt source provides input power into the motor. Any source compatible with motor requirements may be used.

The motor 24 is suitably mounted to the inside of the actuator housing 30. It produces in response to completion of the circuit continuous rotational operation so long as the switch 22 is depressed. Output of the motor 24 is via a direct drive mechanism 32. A reduction gear 40 coupled to the output shaft of the motor increases the output torque. The reciprocating motion of the reduction gear is converted into an up-down translatory movement by output shaft 42 that is suitably bent and coupled to linkage 44.

The camera 16 rests on top of the actuator control compartment 30 and is held in place by a suitable clamp mechanism 46. The height of the camera relative to the actuating lever 34 is also adjustable. Alternatively, not shown, a bolt may be provided to secure the camera via its tripod socket on the camera base to the actuator housing. The camera is positioned so that the actuating lever 34 is disposed directly above the camera shutter release button 48. Actuation of the control motor 24 produces an output via shaft 42 and linkage 44 to drive the actuating lever 34 in a downward direction. This downward motion triggers the camera shutter to take a picture of the object which has positioned itself on top of the pressure plate actuator 26. Accordingly, the triggering of the shutter is in direct response to the positioning of a subject of interest on the actuator plate at the correct focal distance from the camera.

FIG. 2 shows an output reduction gear coupled to a shaft an linkage mechanism. Depending on the mode of photography desired, the output shaft may be replaced by a cam member with the linkage bearing directly on the cam surfaces. Although not shown, it will be appreciated by those having working skill in this technology, that the rotation of a cam member in response to motor rotation will result in a staggered up-down movement as opposed to a purely reciprocating motion at a uniform period. If a camera with a winding attachment is used wherein continuous depression of the shutter will advance the film, the cam surface can be selected to produce a desired downward stroke, thereby resulting in depression of the shutter for a known period of time. For example, if the camera winder advances the film at the rate of 5 frames per second, the cam surface can be selected given the known rotational rate of the motor to produce a downward depression of the shutter for a given multiple number of seconds to produce an even number advancement of exposure frames. If three frames are to be advanced, the actuating lever must be depressed for 0.6 seconds which can be defined as an easily calculated circumferentially extending cam portion as a function of one rotation of the motor.

Other modifications of this invention may be accomplished without departing from the essential utilization of the device. The actuator housing may be placed on the side to provide a "vertical" orientation of the camera depending on the nature of the subject whose photograph is to be taken. Given a positive linkage between the shutter release member 48 on the camera to the motor positioned in any orientation will not affect the operation of the system.

Also, although the device is shown as being positioned below the camera having a vertically extending actuating lever, it is apparent that operation can be effectuated with the motor and its associated drive mechanism positioned above the camera. That is, the camera can be positioned on a base and the output of the motor directed downward onto the shutter release button. This downward directed motion can be either a direct rotational output of the motor, again a cam surface bearing against the shutter release button, an actuating link of the type shown in FIG. 2 or any other equivalent well known drive mechanism.

It is apparent that other modifications of this invention can be made without departing from its essential novelty.

Having defined the invention, I claim:

1. A system for remote actuation of a camera comprising;

a microswitch sensor positioned apart from and providing to said camera a signal indicative of placement of a subject to be photographed at a position relative to said sensor;

means to bias said microswitch to an open position;

a housing holding said camera and disposed to aim said camera at said position;

an actuator located in said housing and receiving said signal, said actuator including a motor driven by said signal;

a source of d.c. power, to drive said motor, disposed in said housing, wherein said microswitch is in series with said source of d.c. power and said motor and closed by the weight of the object, said signal comprising a d.c. voltage to drive said motor so long as said microswitch is closed;

a crank coupled to said motor, a shutter button depression member, gear reduction means coupling said motor to said crank, said gear reduction means determining the extent of crank rotation for each revolution of said motor to groven the minimum number of film frames exposed by said camera for one signal from said sensor, and a flexible linkage coupling said crank to said depression member, wherein for each rotation of said motor said depression member actuates said camera and said linkage restores a shutter button on said camera to an initial position following advancement of a frame.

* * * * *